United States Patent
Anthony et al.

(10) Patent No.: US 6,873,261 B2
(45) Date of Patent: *Mar. 29, 2005

(54) EARLY WARNING NEAR-REAL-TIME SECURITY SYSTEM

(76) Inventors: Eric Anthony, 42 Fosters Green, Sugar Land, TX (US) 77479; Joseph Phillips, 5235 Heather Bloom St., Houston, TX (US) 77045

( * ) Notice: Subject to any disclaimer, the term of this patent is extended or adjusted under 35 U.S.C. 154(b) by 104 days.

This patent is subject to a terminal disclaimer.

(21) Appl. No.: 10/347,050

(22) Filed: Jan. 17, 2003

(65) Prior Publication Data

US 2003/0137426 A1 Jul. 24, 2003

Related U.S. Application Data

(63) Continuation-in-part of application No. 10/007,944, filed on Dec. 7, 2001, now Pat. No. 6,559,769.

(51) Int. Cl.[7] .............................................. G08B 13/00
(52) U.S. Cl. ............... 340/574; 340/573.1; 340/539.18; 340/945; 340/990; 340/426.1; 348/148; 382/115
(58) Field of Search .............................. 340/574, 573.1, 340/539.18, 945, 990, 426.1; 348/148, 153, 143; 701/14; 382/115

(56) References Cited

U.S. PATENT DOCUMENTS

| | | | | |
|---|---|---|---|---|
| 4,644,845 A | * | 2/1987 | Garehime, Jr. | 89/41.05 |
| 5,027,104 A | * | 6/1991 | Reid | 340/541 |
| 5,396,227 A | * | 3/1995 | Carroll et al. | 340/825.36 |
| 5,666,157 A | * | 9/1997 | Aviv | 348/152 |
| 5,689,442 A | * | 11/1997 | Swanson et al. | 380/241 |
| 5,712,830 A | * | 1/1998 | Ross et al. | 367/93 |
| 5,986,543 A | * | 11/1999 | Johnson | 340/426.19 |
| 6,069,655 A | * | 5/2000 | Seeley et al. | 348/154 |
| 6,150,927 A | * | 11/2000 | Nesbitt | 340/426.25 |
| 6,157,317 A | * | 12/2000 | Walker | 340/7.1 |
| 6,211,907 B1 | * | 4/2001 | Scaman et al. | 348/148 |
| 6,246,933 B1 | * | 6/2001 | Bague | 701/35 |
| 6,392,692 B1 | * | 5/2002 | Monroe | 348/143 |
| 6,429,773 B1 | * | 8/2002 | Schuyler | 340/425.5 |
| 6,570,609 B1 | * | 5/2003 | Heien | 348/148 |
| 6,573,839 B2 | * | 6/2003 | Kimmet | 340/945 |
| 6,587,046 B2 | * | 7/2003 | Joao | 340/539.14 |

* cited by examiner

Primary Examiner—Benjamin C. Lee
(74) Attorney, Agent, or Firm—Harrison Law Office

(57) ABSTRACT

An early-warning security system for monitoring and tracking in real-time or at least in near-real-time the activities and movements associated with prescribed personnel, personal property, mobile vehicles, and buildings. The system comprises a plurality of in situ local controllers having a microprocessor and a coordinated plurality of conspicuous and clandestine digital video cameras for continuously producing digital audio and visual signals, uplinking such signals via a suitable wireless telecommunications device to a satellite, general packet radio service, the Internet, intranet or extranet, and then downlinking these signals to a plurality of control centers for recording and analysis thereof. Uplinking of these digital signals may occur continuously or may be activated by a manual or predefined trigger event. Preventive or remedial action is immediately taken when perturbations from normal behavior or activities are observed in the recorded audio and visual signals.

72 Claims, 6 Drawing Sheets

EARLY WARNING NEAR-REAL-TIME SECURITY SYSTEM

RELATED APPLICATIONS

This application is a continuation-in-part of U.S. application Ser. No. 10/007,944 filed Dec. 7, 2001, now U.S. Pat. No. 6,559,769.

TECHNICAL FIELD OF THE INVENTION

The present invention relates to security systems, and, more particularly, relates to systems for providing security to individuals, companies, organizations, the United States Government, and to other government bodies—from states to municipalities or the like—wherein clandestine audiovisual surveillance may be conducted in real-time or at least near-real-time, and may be duly uplinked and recorded for contemporaneous analysis and immediate remedial action, if necessary.

BACKGROUND OF THE INVENTION

It is well known in the art that security is a primary consideration prerequisite for the peaceful enjoyment of the fruits of freedom and the survival of individuals and organized bodies alike. For example, to promote security for the citizenry at large in most communities throughout the United States, it is imperative to keep doors and windows locked at home, to keep automobiles locked and secured by alarms, and, generally, to be aware of one's surroundings while walking on streets, driving in automobiles or the like, and shopping in malls or in stores. As another example, to promote security for commercial establishments, public places such as libraries and the like, and government entities, it is imperative to provide full-time guards, limited access via X-ray machines or biometrics screening devices, etc.

There have been many threats to and assaults upon United States property and personnel throughout the world made by radical and terrorist organizations. Personnel have been victimized by criminals and the mentally-unstable. Young children, teenage girls, and women have proven to be especially vulnerable to such exploitation. Assaults have been perpetrated against several United States Embassies on foreign soil and to United States ships on international waters. Unfortunately, to the horror of United States citizens and, indeed, to concerned peoples throughout the world, terrorist attacks have recently been made on United States soil to privately-owned skyscrapers in New York City and to the Pentagon in Washington, in the District of Columbia. Enormous loss of human life and property occurred, and a concomitant trauma to the extant quality of life that had been the norm in a free country such as the United States.

The inadequacy of existing systems for protecting persons and property on a daily, routine basis to such horrific threats and incidences of terror has become clear. Indeed, much time and effort is being applied by government and private entities, and by individuals to augment and enhance the integrity and efficacy of security procedures. As will be understood by those skilled in the art, what is needed is a methodology that provides a real-time or near-real-time window into a diversity of activities—both legitimate and illegitimate, legal and illegal—at appropriate times and places whereby prompt measures may be timely taken to prevent or at least minimize personal injury and property damage. Unfortunately, notwithstanding the use of sophisticated surveillance technology and the expertise and valiant efforts of government entities such as the Central Intelligence Agency and the Federal Bureau of Investigation, an early-warning, real-time or near-real-time system or methodology to effectively foil assaults by terrorists or the like has heretofore been unknown.

Accordingly, these limitations and disadvantages of the prior art are overcome with the present invention, and improved means and techniques are provided which enable future, incipient or current attacks by criminals, the mentally unstable, and terrorists to be prevented or promptly mitigated.

SUMMARY OF THE INVENTION

In one aspect of the present invention there is provided a system for tracking the activities and movements of young children and teenagers to promote their personal safety and well being. In another aspect of the present invention there is provided a system for monitoring all personnel activities and incursions related to edifices including commercial, public, and government buildings. In yet another aspect, this system provides a means and methodology for safeguarding any and all conduct effectuated on public mobile vehicles such as commercial airplanes, trains, buses, boats, or the like. Thus, an embodiment of the present invention designed for use on airplanes would continuously monitor, record, and analyze in real-time or near-real-time not only the activities of pilots in the cockpit, but also would the activities of flight attendants and passengers throughout the airplane. Such an embodiment would also preferably continuously monitor, record, and analyze in real-time or near-real-time the activities of all maintenance and other service personnel. Other embodiments of the present invention could be applied to common situations such as identification of criminals and suspects in public places, remotely and locally monitoring homes and automobiles, and monitoring roadside assistance. It will become evident that the present invention also contemplates embodiments suitable for use in a wide range of activities and events that are common in contemporary times; these systems run the gamut from people making reservations for air, land and sea travel to emergency responses effectuated by specially-trained professionals.

Under the present invention, such activities and events are continuously captured and uplinked in real-time or at least near-real-time along with received or generated control signals to a plurality of control facilities for recording, monitoring, and contemporaneous analysis. As will be appreciated by those skilled in the art, audiovisual uplinking may be achieved via satellite transmission, general packet radio service ("GPRS"), cellular telephone communications, microwave communications, land-line telephonic communications, Internet-based or intranet or extranet-based telecommunications, wireless communications, or any other means for expeditiously sending audiovisual signals from a local site to a remote site essentially in real-time or near-real-time. Thus, clearly incorporated into the concepts taught by the present invention are such telecommunications developments as the Bluetooth interface which, as will be appreciated by those skilled in the art, enables a no-boundaries environment for remote wireless communications. Indeed, it an objective of the present invention to provide the ultimate security solution to individuals, the federal and state government—and to towns, municipalities and villages subsumed thereinto—as well as to corporations and the like.

An embodiment of the present invention applicable to children and teenagers is suited to be inconspicuously worn as a normal bracelet, necklace, or the like. It is contemplated that contained in such bracelet will be a miniature video camera or the like that, when activated by a child or teenager, or otherwise activated remotely by a parent or other supervisory adult, will commence recording the immediate environment and activities occurring thereat. Any perturbation to or deviation from the normal behavior associated with such environment, e.g., school yard, playground, library, mall, etc., will be observed in real-time or near-real-time and contemporaneously be duly captured on remote hard disk and/or videotape or the like so that immediate preventive or remedial countermeasures may be effectuated as appropriate.

The preferred embodiment of the present invention is applicable to an automobile and other mobile vehicle, and comprises a plurality of video cameras disposed at strategic locations in or on the automobile so that events may be documented in real-time or at least near-real-time for analysis at a plurality of remote control sites. It is contemplated that all of such plurality of cameras will be clandestinely disposed in and about a mobile vehicle or that a token number thereof will be conspicuously disposed to serve a twofold purpose. First, upon noticing the plurality of conspicuously-disposed cameras, an intruder or an incipient intruder may be dissuaded from actually intruding upon the vehicle. Second, if an intruder is not and, indeed, will not be dissuaded from intruding, then the plurality of conspicuous cameras are apt to be manually disabled while the plurality of clandestine cameras provide a real-time or near-real-time video stream that captures the intruder's activities. It will be understood that the plurality of digital cameras and the like—both conspicuous and clandestine—may be either manually activated by the authorized vehicle operator, automatically activated by the authorized operator initiating a trigger event, or automatically be in an "always-on" condition.

The preferred embodiment configured for use in an airplane comprises a plurality of hidden video cameras disposed at strategic locations in the cockpit and passenger compartment and all other designated areas. It will be obvious that the system of the present invention teaches that all activities that occur on a commercial aircraft or the like should preferably be monitored for security purposes. Accordingly, the system not only monitors and records the activities that occur within the cockpit, but also monitors and records the activities and events that occur within the passenger compartment and other common areas on the airplane. It will also be appreciated that such monitoring is not limited to times when vehicles, e.g., rental automobiles, buses, trains, and airplanes, are in service, but also includes times when the vehicles are being maintained and otherwise serviced.

Thus, the present invention provides a system that inherently affords an early warning of any and all activities that suggest that an anomalous situation may arise or, indeed, that show that an anomalous situation has arisen—in real-time or at least in near-real-time. For example, if there were intruders present in the cockpit, the system would immediately "report" this occurrence in real-time or near-real-time. If there were a commotion occurring in the passenger compartment, the system would provide an early warning thereof to not only the crew in the cockpit, but also to personnel at the control center facilities. If there were any peculiar activities occurring during normal servicing of the airplane between flights or during maintenance operations, the system taught by the present invention would have knowledge thereof.

If a child in a playground is engaging in conversation with a stranger or even an unfamiliar playmate, the early warning aspect of the present invention would be triggered. Similarly, if a woman approaching her automobile in a parking garage felt threatened by strange footsteps or other sounds, she could manually trigger the system to uplink a call for immediate assistance. Obviously, the present invention contemplates that trained personnel are observing and analyzing the stream of audio video signals continuously being down linked to control center facilities, for taking immediate and appropriate action to either prevent or mitigate personal injury and property damage.

These and other objects and features of the present invention will become apparent from the following detailed description, wherein reference is made to the figures in the accompanying drawings in which like numerals refer to like components.

IN THE DRAWINGS

DETAILED DESCRIPTION OF THE INVENTION

Figure 1:
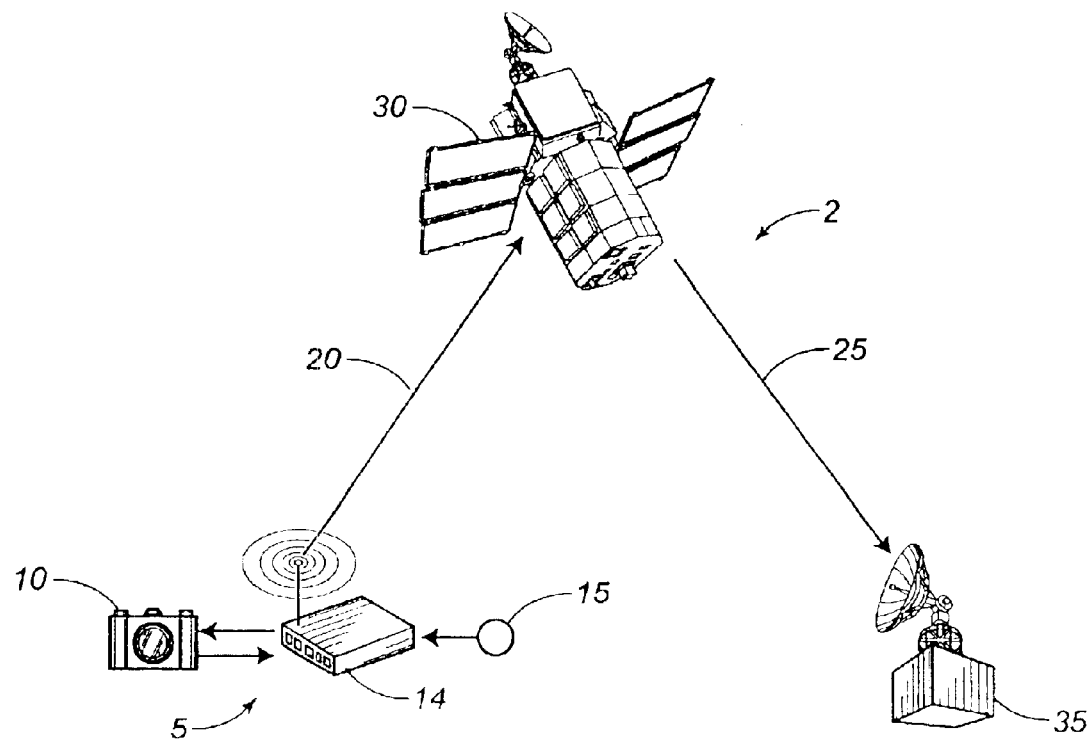
FIG. 1 is a simplified flow diagram depicting the system flow of the preferred embodiment of the present invention.

Now referring to FIG. 1, there is depicted a simplified system flow diagram depicting the general flow of the early warning near-real-time security system 2 taught by the preferred embodiment of the present invention. As will become evident to those skilled in the art, the present invention delivers a continuous stream of audio video and control signals that correspond to the real-time or at least near-real-time rendition of a physical event or a series of events. Such continuous stream of information may pertain to the movement of a plurality of individuals relative to environing premises or to associated vehicular travel. It will become clear that users of embodiments of the present invention may remotely access a security database containing not only near real-time audio and visual streaming information and the like, but also, accumulated historical audio and visual streaming information wherein an early-warning security system may be invoked via a properly configured microcomputer in any of several forms, including a desktop microcomputer, a notebook microcomputer, a hand-held Palm, Blackberry, or the like, or even a cell phone or the like. This access may be effectuated at home, at work, or at virtually any place therebetween. As appropriate, immediate remedial action may be triggered in the form of controlling the behavior and interaction of the plurality of individuals relative to the environing premises or to associated vehicular travel, or by triggering response from dispatched law enforcement personnel or the like, or a combination thereof.

In particular, FIG. 1 depicts an embodiment of the present invention configured for use in an automobile. Local controller apparatus 5 is clandestinely positioned in an automobile (not shown) for capturing audio video signals 20 via plurality of cameras 10 and then uploading these signals in near-real-time to satellite 30. After being uploaded to satellite 30 via input stream 20, the corresponding audio video signals are then transmitted via download stream 25 to a monitoring station or home base 35. Monitoring apparatus 5 comprises activation means 15 to trigger continuous monitoring, uplinking-and-downlinking, and recording, in at least near-real-time, on a manually-activated basis. Of course, it is within the teachings of the present invention to perform this continuous monitoring, uplinking-and-downlinking, and recording on an automatic basis or on a periodic basis—depending upon the nature of an anticipated or expected series of activities or the like.

It will be understood that, in the implementation of the present invention in an automobile or similar vehicle, it is preferable to include plurality of digital cameras 10 to provide fail-safe and adequate monitoring and recording of activities and events as they occur. Thus, such cameras may be disposed in or on the dome light, the rear-view mirror, and any other suitable location in the automobile, in a combination of a clandestine and a conspicuous manner. That is, it has been found to be advantageous to conspicuously situate a digital camera and the like in order to deceive an intruder or the like into believing that no other such devices are present. If notice of this plurality of conspicuous devices fails to deter the intruder from perpetrating unauthorized acts, then the plurality of clandestinely situated cameras and the like will record in at least near-real-time as contemplated hereunder.

Figure 2:
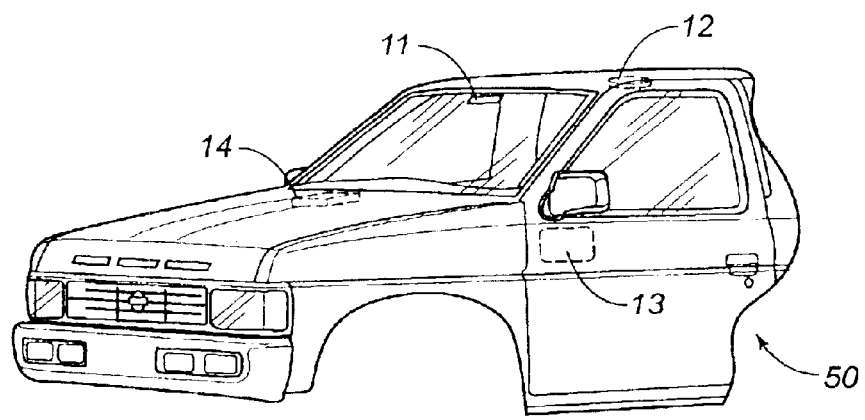
FIG. 2 is a simplified sketch of the positioning of a portion of the preferred embodiment in and on a conventional automobile.

Referring now to FIG. 2, there is shown a simplified sketch of the positioning of an embodiment of the present invention into conventional automobile 50. The plurality of cameras comprising on-board apparatus 5 include camera 11 disposed on or about the rear-view mirror located upon the windshield, camera 12 disposed on or within the dome light, and camera 13 disposed on or within the driver-side door handle. It should be evident to those skilled in the art that the plurality of cameras contemplated by the present invention may be situated at any combinations of locations either inside or outside the automobile to reliably and accurately depict the happenings to the driver and passengers.

Also shown in FIG. 2 is "black box" 14, another component of on-board apparatus 5, which contains a microcomputer or the like to control the coordination of activation of the plurality of cameras and the uplinking of the generated audio video signals to a satellite, GPRS, or other receiving means. It will be understood that black box 14 should preferably be tamper-proof to prevent an intruder or the like from deactivating or otherwise adversely affecting operational attributes of the system of the present invention. Accordingly, local controller 14 should be clandestinely stored in the hood or trunk or other suitable location; it will be appreciated that it may be the size of a conventional notebook computer, or sub-notebook computer, or hand-held computer, or even smaller depending upon the electronics and boards or the like used to implement the prerequisite control circuitry.

Figure 3A:
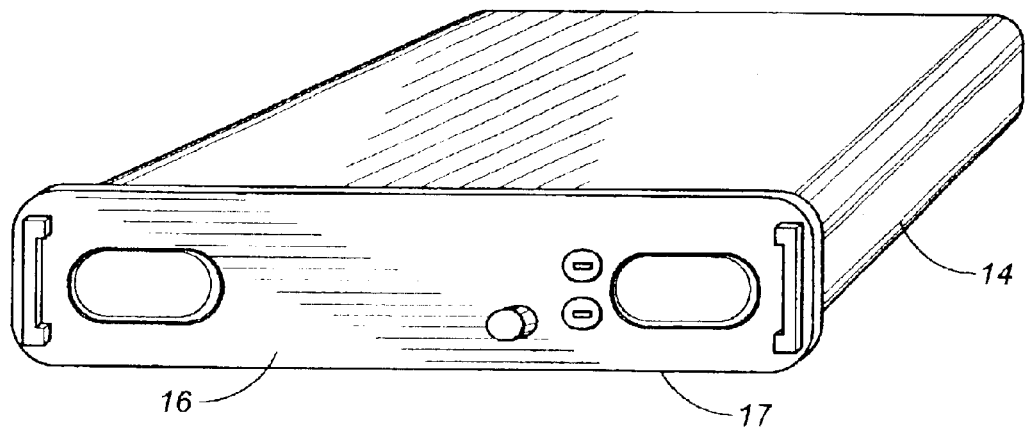
FIG. 3A is a perspective frontal view of an embodiment of the black box or local controller depicted in FIGS. 1 and 2.
Figure 3B:
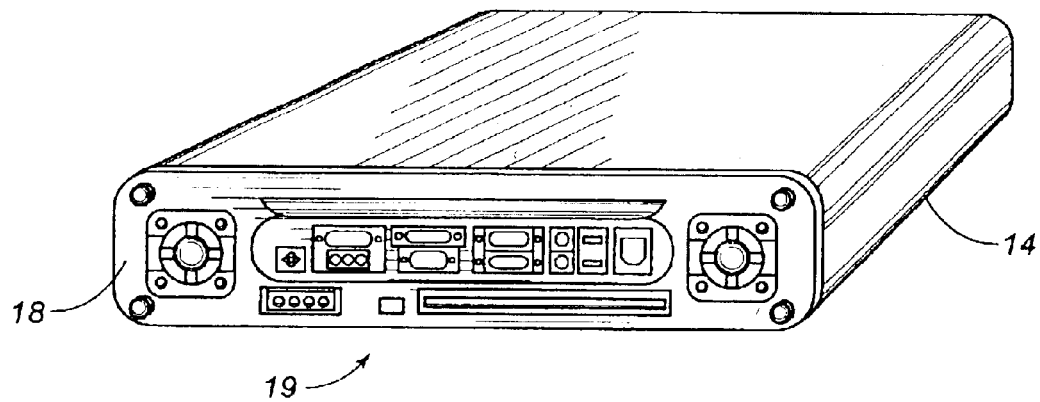
FIG. 3B is a perspective rear view of an embodiment of the black box or local controller depicted in FIG. 3A.
Figure 3C:
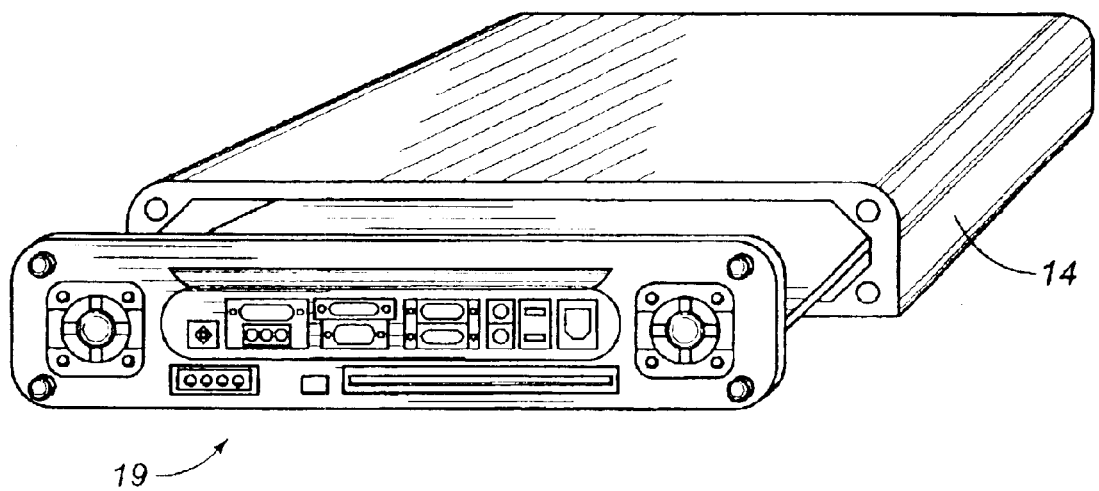
FIG. 3C is a perspective frontal view of the embodiment of the black box or local controller depicted in FIGS. 3A and 3B, with the system board being removed from its case.

Referring to FIGS. 3A and 3B there is depicted perspective frontal and rear views, respectively, of a notebook-sized version of black box 14 (FIGS. 1 and 2). Thus, FIG. 3A clearly shows front 16 of local controller 14 including air flow inlet port means 17 to cool the circuitry contained therewithin. Also shown is plurality of activation and override buttons to allow for predetermined settings to be made once proper authentication has occurred. FIG. 3B shows the rear 18 of controller 14 with a plurality of conventional ports 19. More particularly, there is shown external cooling fan means, AC power connector, 101/100 network interface connector (NIC), USB connectors, TV output connector (NTSC/PAL), audio/microphone signal input/output connector, CRT connector, card release, PCMCIA Type II—wireless modem, and KB connector. FIG. 3C depicts a perspective frontal view of the embodiment of the local controller depicted in FIGS. 3A and 3B, with the system board being removed from its case. This convenient removal of the system board, of course, enables any upgrades or other system adjustments and tweaking to be easily made in the field.

Figure 4:
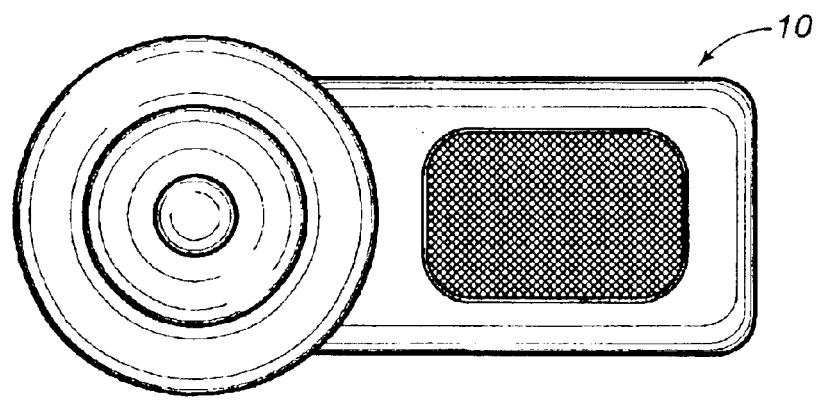
FIG. 4 is a frontal view of a typical miniature camera incorporated into the preferred embodiment.

A typical miniature camera incorporated into the preferred embodiment is depicted in FIG. 4. In particular, each of the means for capturing digital video and digital audio attributes of activities and events is shown. Of course, there are several so-called "spy cameras" and the like that may be used in embodiment of the present invention. For example, The Farm Wagon sells black-and-white, color, and weatherproof models on its Web site (www.farmwagonl.com/spyweb). It will be clear to those skilled in the art that the present invention contemplates any of a plurality of security cameras, video surveillance systems, video cameras, hidden cameras, "nanny cams," covert video, wireless spy cameras, surveillance products, wireless video, miniature pinhole cameras, etc. As will be appreciate by practitioners in the art, miniature stealthy video cameras may be delivered with or be hidden within wall clocks, smoke detectors, clock radios, emergency lighting, books, etc. Of course, it will be understood that concealed wireless camera systems can be moved from room to room, or otherwise ported from one location to another. Typically, stealthy video surveillance systems known in the art are designed to function in plug-and-play modus operandi.

Representative of black-and white camera models, the CAM1-BW2000 is dimensioned only 30 by 30 by 15 mm, about the size of a quarter, and the CAM2-BWMICRO is dimensioned a mere 25 by 25 by 15 mm. The CAM1-BW2000 camera performs with just a pin-hole, wherein it may be hidden in such common items as a clock, a book, a toy; obviously, it may be strategically positioned to record images through a wall or the like. It is a feature of this micro sized camera that sharp 420-lines' high resolution video is recorded, even under low light conditions. It is powered either by standard AC supply or by a battery pack for use in remote locations. The CAM2-BWMICRO is one of the world's smallest video cameras that needs only a pinhole to see through. Similar to the CAM1-BW2000, it also provides crystal-sharp 420-lines' high resolution video.

The CAM3-BULLET corresponds to a black-and-white, bullet-shaped, weather-proof camera that is ideal for outdoor applications. Typically applications include business and home security. For a typical color model, the CAM5-CC2000, dimensioned 36 by 36 by 15 mm, is a miniature camera that only needs a pin-hole to see through. It provides sharp 380-lines' high resolution video, even under low light conditions. Of course, another option is a camera having an infrared lens applicable for night vision: the CAM4-IRB. Dimensioned 25 by 25 by 15 mm, this high resolution black-and-white camera is constructed with LED emitters that create an illuminated light source for enabling the camera to record images in total darkness. As will be appreciated by those skilled in the art, this light spectrum exceeds normal human vision so that images are recorded that are invisible to the naked eye. Suitable for outdoor use under poor weather conditions, each of the camera and LED emitters is sealed in a water-proof bullet-shaped case.

It will be appreciated by those skilled in the art that the present invention contemplates that cameras will be selected commensurate with the application requirements to accommodate lighting conditions, physical constraints, prevalent weather, etc. It will also be understood that the present invention contemplates the use of special variable lenses that change sensitivity to and filtration of light based upon the quality and quantity of available light. Thus, such variable lenses limit the exposure to available light when excessive light is present, and, contrariwise, enable maximal exposure to available light when only minimal light is present.

Figure 5:
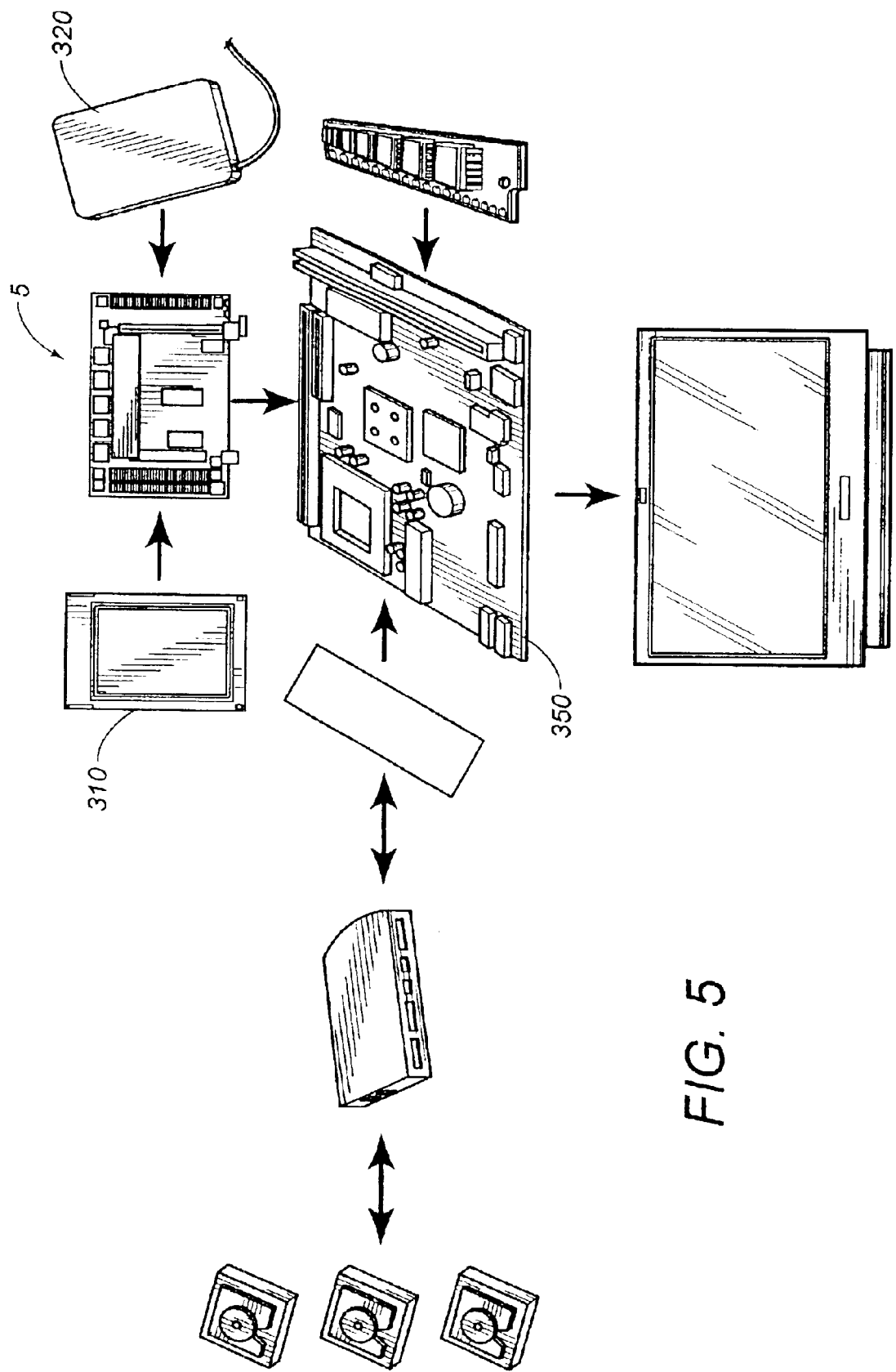
FIG. 5 is a simplified system flow diagram of the hardware components comprising an illustrative embodiment of the local controller assembly of the present invention.

Now referring to FIG. 5, there is depicted a simplified system flow diagram of the hardware components comprising an illustrative embodiment of the local controller assembly 5 of the present invention designed for use in a vehicle such as an automobile. Referring collectively to FIGS. 1–5, a typical camera that may be used in this embodiment is Sony CCD ⅓" 3.7 mm wide angle pinhole lens which may be ported to a USB hub. In a manner known in the art, the audio video signals captured by the camera are communicated through the USB port to a suitable microprocessor, exemplified herein as Aaeon 4898 compact board.

Manufactured by Aaeon Electronics, Inc., this microprocessor board is preferably augmented with 512 MB of RAM. The Aaeon PCM-4898 board can be equipped with an all-in-one multimedia NS Geode GXm CPU up to 300 MHz; has an integrated audio and video controller, a PCI Flat Panel controller, Fast Ethernet controller, LVDS interface, four COM ports, 4TTL digital I/O interface and one PISA expansion slot. The onboard SSD interface supports the M-Systems DiskOnChip 2000 series with a memory capacity up to 288 MB. With dimensions of only 6.378"×7.87", the PCM-4898 is a compact unit that offers all the functions of a single board industrial computer. Its onboard features include an LVDS interface onboard, three RS-232 and one RS-232/422/485 serial port, connectors for two USB devices, a floppy drive controller, and a keyboard/PS/2 mouse interface. The built-in high speed PCI IDE controller supports Ultra DMA/33 mode and is able to connect up to two IDE devices, including large capacity hard disks, CD-ROM drives, and tape backup drives. This board is also configured with standard external connectors on one edge for easy integration and assembly, and provides power management to minimize power consumption, having three types of power-saving features: Doze mode, Standby mode, and Suspend mode. The board's watchdog timer automatically resets the system or generates an interrupt in case the system stops due to a program bug or EMI. The PCM-4898 is an integrated multimedia SBC that combines audio, video, and TV-output functions on a CD-ROM drive-size single computer board. It provides 16-bit full-duplex, integrated 3D audio and up to 1024×768 resolution at 64K colors.

To provide navigation across city streets and, of course, to readily identify the location of the automobile, this embodiment of the present invention avails itself of the GPS. Thus, hardware components comprising a PCMCIA module interconnected with a PCMCIA modem and a PCMCIA GPS receiver contribute this GPS functionality.

It will accordingly be understood that the present invention relates to a security system that affords a synergy of real-time and near-real-time audio visual, full-motion continuous remote monitoring and analysis. Alternatively, the present invention teaches a real-time or near-real-time audio visual, full-motion continuous remote monitoring and analysis methodology that is activated either manually or via a predefined trigger event. For instance, activation may be manually triggered by the operator of an automobile feeling threatened by an approaching stranger. Activation may also be manually triggered by such driver imminently entering a parking garage late at night when few cars remain in the garage. On the other hand, it is contemplated by the present invention that activation may be triggered by a loud noise or by a sudden movement. Hence, a burglar breaking a car window or perhaps a sound indicating a collision between two automobiles or another loud sound or noise could constitute a trigger event as contemplated by the present invention. As another illustration, an automatic trigger event might be a deviation from a driver's normal driving habits or the driver not operating the automobile.

It is contemplated that by using a microprocessor commonly used in laptop and notebook computers, audio video signals may be received from a plurality of on-site preferably clandestine cameras, then the audio video signals along with received or generated control signals are preferably compressed for fast uplinking in real-time or near-real-time via a wireless modem or the like to satellite, to a GPRS, to the Internet, to an intranet or extranet or the like, and then down linked for recorded directly onto a plurality of hard drives or other suitable storage means known in the art. It will be appreciated that this stream of down linked audio visual data may be compiled into a valuable historical database that may be advantageously interrogated by personnel associated with law enforcement or other government agencies, insurance, etc.

For certain physical environments and the like, the series of steps taught by the present invention, namely, activation, creating digital audio and visual signals, uplinking, downlinking, recording, analysis, and remedial measures, may be assigned preset schedules. The system taught by the present invention thus provides a "hot link" between its locally implemented controller apparatus and a plurality of remote receivers that record and monitor activities and events based upon a sequence of audio video signals and control signals received in real-time or near-real-time. It should be apparent that the present invention contemplates systems ranging from transmission of audio visual signals by dialing up predetermined phone or Internet (or intranet or extranet) numbers via cell phone or other wireless telecommunications to the transmission of audio visual signals by beaming up to satellite or GPRS or the like, to access special broadband networks over designated frequencies or the like. The system can even call designated pagers by transmitting digital video and audio signals with GPS data. Of course, PDA devices such as embodiments of the Palm Connected Organizer and the RIM Blackberry devices may be used for sending and/or receiving information contemplated hereunder.

It will be appreciated that by transmitting signals from a remote site via one of a plurality of cameras as hereinbefore described and a conventional modem the system of the present invention can provide up to 8 FPS, e.g., recording from a camera disposed behind an automobile's rear-view mirror. The presence of another camera may enhance the depiction of the situs being secured via faster frames, e.g., with a camera mounted on the driver's side-view mirror outside the automobile to afford yet another view of the circumstances (affording a frequency of at least 33.6 MHz). Obviously, implementing embodiments of the present invention with high-speed, broad-band connections such as high-speed modems, T1 lines, ISDN connections, or DSL connections significantly improve telecommunication transmission speed and efficiency.

It will be understood that the present invention negates the necessity of individuals or organizations seeking to protect person or property using such devices as a TV, VCR, motion detector, or the like. Embodiments of the system taught by the present invention may use a video switcher, and Quad or Mux in the USB port to provide the contemplated functionality. Depending upon the physical nature of the scenario in which people and property are being secured and protected, the plurality of cameras and the local controller/black box must be sized appropriately to sustain clandestine operations. Generally, the hardware components of embodiments of the present invention should be minimized to maximize the likelihood of monitoring and recording activities and events without being detected.

It is contemplated that the software implementation aspect of the present invention comprises modules or the like that readily effectuate local and remote communication between the vehicle, person, or premises being monitored for generating and transmitting signals in real-time or at least in near-real-time, on the one hand, and a centralized data center which receives and analyzes these signals, on the other hand. Then, a plurality of appropriate modules triggers remedial action or the like as needed. While the preferred embodiment corresponds to a telematics environment for safeguarding automobiles and the like, wherein there is manifest a convergence and cross-fertilization of telecommunications and information processing invoking GPS satellite tracking and wireless communications, it should be evident that other embodiments may be expeditiously applied to such crucial applications and environments as monitoring and securing all activities pertaining to air travel, all electronic and control instrumentation and the like for flying airplanes, nuclear and chemical plants, oil refineries, gas plants, pipelines, bridges and tunnels, public buildings, trains and subways, etc.

As will be appreciated by those skilled in the art, 2.5/3G technology is preferably incorporated into the preferred embodiment (GSM/GPRS or CDMA2000 1x) to accomplish the purposes described herein. Of course, the software of the present invention is contemplated to run on all operating systems and platforms including Windows 95, 98, ME, 2000, CE; Palm OS; Mac OS; Linux; VxWorks; and the like. The operating system and file server environment for the preferred embodiment comprises Windows 2000 Advanced Server, Palm OS, Windows CE, SQL Server 2000, Windows Media Services and Internet Information Server, Visual Studio Embedded, Visual Studio C++, Visual InterDev. It will be appreciated that toolkits or the like including a mapping solutions SDK and a custom-developed SDK for satellite communications. Also incorporated into the preferred embodiment are video/audio codecs for use in conjunction with a microcomputer disposed on a single-board and suitable peripherals. Of course, to achieve the communications objectives described herein, a suitable microprocessor such as a Pentium III is used with satellite and cellular hardware. It should be apparent that other hardware components include cameras, microphones, GPS cards/modules, and preferably a USB hub.

One aspect of embodiments of the present invention is preferably audio streaming and video streaming from an in situ mobile device to a remote site—including a Web site—functioning as a control and data center. In its simplest implementation, this link may be achieved via a local area network (LAN) and a dial-up (land-line, cellular, etc.) telephone connection. It will, of course, be evident to those skilled in the art that a more expeditious and responsive linkage should be established using high-speed, broadband and a wide-area network (WAN) or the like. It will also be clear that incorporating satellite communications into the linkage inherently affords broad coverage and communications contemplated by the present invention. Thus, real-time and near-real-time video streaming is accomplished across GPS satellite communications with map information being available for complete tracking and monitoring purposes. In order to thoroughly record and process the streams of video and audio signals, the present invention is constructed with functions to provide remote stream control and frame rate control. All recorded data is stored in a plurality of databases located at a central control and data center, or, alternatively, located at a plurality of regional central control and data centers which are dispersed geographically as appropriate.

It should be clear to those skilled in the art that the benefits provided by the present invention may be enjoyed from a home-base personal computer, comprising a desktop, a notebook, a sub-notebook, or a PDA, as well as from a sophisticated regional control center. Indeed, under the teachings of the present invention, such home-base personal computers are envisioned as constituting an aspect of the data/control center concept.

It will be appreciated by those skilled in the art that the present invention is designed to perform as contemplated hereunder in both real-time and near-real-time. Real-time generally applies to monitoring and recording of events and activities wherein there are no appreciable or significant system delays—attributable to such phenomena as network latency, upload transmission time, download transmission time, etc. Real-time is construed as applying to a system wherein there is no measurable delay between establishing/acquiring a GPS location and downloading this location for analysis and the like. Similarly, remotely monitoring the events and activities involving a plurality of mobile vehicles or individuals may be achieved in real-time or at least near-real-time according to the teachings of the present invention.

It will be understood by those conversant with the art that the present invention contemplates a system for monitoring, collecting, analyzing, uploading and downloading signals wherein authorized personnel may take prompt and immediate remedial action to minimize the impact of untoward or terrorist events upon persons and property. Accordingly, the purposes of the present invention will be achieved so long as the plurality of audio visual and control signals are generated, recorded, transmitted, collected, and analyzed sufficiently close in time to the actual events and activities being monitored and tracked. It will be apparent that, in order for these signals to accurately and timely echo such actual events and activities, the signals must be at least be generated, recorded, transmitted, collected, analyzed—as appropriate under exigent circumstances—in at least near-real-time.

Figure 7:
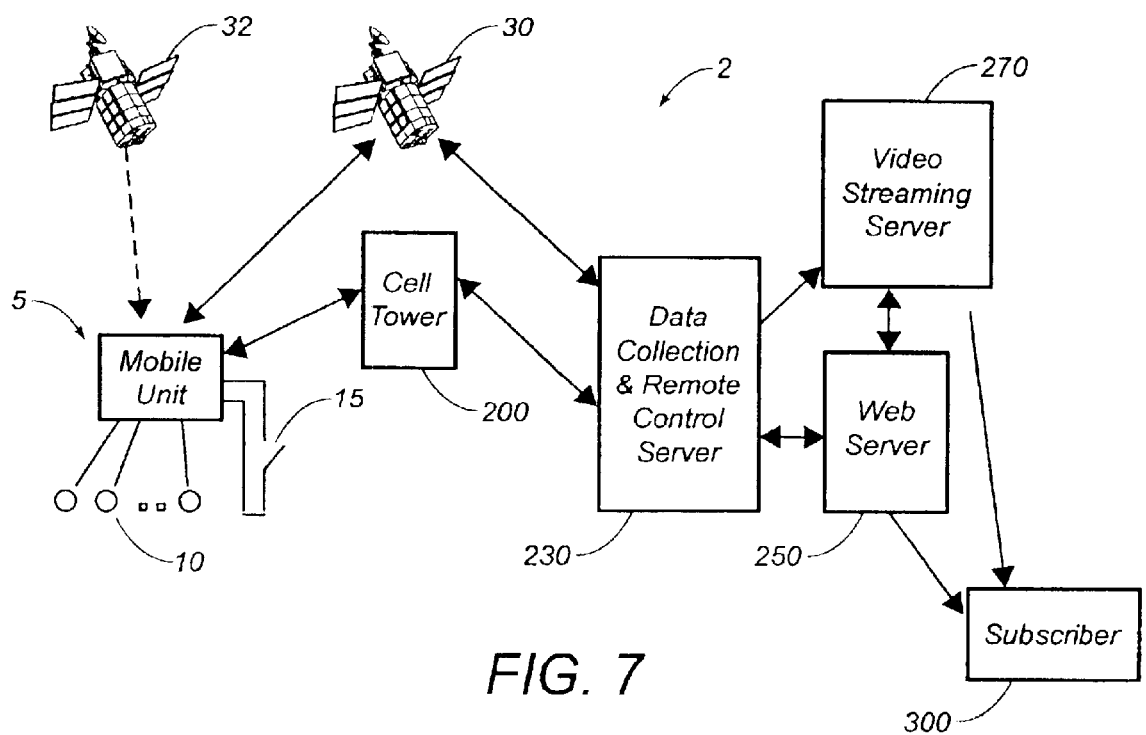
FIG. 7 is a simplified schematic diagram of the real-time communications aspect of the preferred embodiment of the present invention.

Referring to FIG. 7, there is seen early-warning security system 2 of the preferred embodiment of the present invention. Mobil unit 5 should preferably comprise an integrated circuit board 350 having a built-in CPU with concomitant architecture suited to accommodate embedded and multimedia processing. It should be evident that real-time connectivity or at least near-real-time connectivity is an important feature of the present invention, wherein a plurality of remote, mobile units continuously "talk-to" a plurality of control centers or the like via appropriate communication links to provide a motion picture describing what is occurring in the real world. Such connectivity may be achieved through a combination of wireless devices and infrastructure including cell phones, microwave phones, personal digital assistants (PDAs) and hand-held computers (Palm, pocket PC, etc.), satellites, and the GPS.

Cellular connectivity may be implemented in mobile units using a PCMCIA modem card 310 for 2.5G cellular services. It will be understood that a 56K bps communication link is prerequisite for video streaming to function as taught by the present invention. Satellite connectivity may be implemented, of course, by a satellite communication modem 320 plugged into the circuit board's serial port to send and receive messages on the order of a 9.6K bps transfer rate.

The cumulation of streams of signals are received and collected by data collection and control server 230. It will be appreciated that server 230 uses SDKs that talk to the satellite provider network for sending and receiving messages. TCP/IP will be used over cellular communications channel 200. Web server 250 provides an interface through which an operator may observe and analyze recorded streams, and then make responses as appropriate such as initiating command signals sent to mobile unit 5. Similarly, an operator may readily map geographic location from GPS positioning information 32.

Also depicted in FIG. 7 is streaming media server 270 which stores recorded video clips for streaming to designated Web sites. Authorized personnel may access this information, once proper authentication has been confirmed. Such authentication may be achieved via passwords, encryption, confirming predetermined biometrics information or a combination thereof. It will be understood that biometrics refers to several evolving technologies that identify an individual based upon measurement of a plurality of the individual's physical characteristics of body parts. Thus, it is contemplated that biometrics authentication in conjunction with the present invention include measurement of fingerprints, facial geometry, retina, hand shape and surface patterns, etc. The present invention, of course, enables authorized personnel to access recorded and uploaded video streaming information and the like via a plurality of devices at a plurality of locations—both permanent and mobile.

For instance, a subscriber may achieve access from a desktop or notebook computer located at home. The subscriber may establish the preferred embodiment to geofence the travel of a family member, wherein certain geographical boundaries are defined for anticipated travel. Hence, a fifty-mile radius may be established as the geographic boundary for a particular trip using GPS satellite communications and a maps database to monitor travel progress. If this geofence constituting a fifty-mile radius is traversed, then the security system of the present invention provides an early-warning advising of the transgression of predetermined travel boundaries. It will be understood that this geofencing may be monitored via mobile devices such as a notebook computer and a PDA, using cellular, radio, or microwave communications, or the like across the Internet, private intranet or extranet, or the like.

It will be appreciated that embodiments of the present invention may be applied to all means of transportation including air travel, water craft, trucks, buses, etc. In the instance of air travel, the flight plan is preestablished and is known to Flight Control personnel. The present invention provides a means and method for authorized personnel to obtain an early-warning in real-time or at least near-real-time of any violation of the geofence defined by the flight plan. Similarly, the present invention may be applied to safeguard family and friends who are engaging in sports activities such as boating, fishing, and the like. Geofencing and other monitoring herein described may be effectuated in real-time or near-real-time to provide an early-warning if circumstances go awry or appear to be deviating from expected standards.

It will be appreciated that a maps database and SDK may be included in the plurality of databases of the present invention to assist in and enhance the visual presentation of a vehicle at a particular GPS location. The GPS module contemplated by the preferred embodiment of the present invention may be a PCMCIA card 320 or an on-board add-on module. Instructions for extracting GPS information from the card or module is preferably implemented in software. Of course, it is clear that these instructions may be implemented in ROM or the like, instead of software.

Peripherals such as cameras 10, microphones, or the like enable live streaming to be effectuated from a plurality of remote recording units whereupon the corresponding stream of audio video signals along with received or generated control signals are then uplinked as described herein. Preferably, a plurality of USB cameras such as Pinhole CCD cameras may be used. An external alarm switch 15 or the like may be connected to the serial port of a mobile unit to depict and signal an important occurrence. Obviously, this mechanism invokes an alarm mode of operation. It has been found that a voltage change over the serial port can be used to indicate a button press by the user.

Now focusing on another aspect of the present invention, it is important for a mobile unit to function in an "always on" condition. For always-on cellular connectivity, it has been found that 2.5G/3G wireless communications provides prerequisite functionality for staying connected to a wireless network. As will be understood by those conversant in the cellular art, CDMA, TDMA, GSM, GPRS, and CDPD protocols technology may be used. Of course, wireless networks may be assembled using Wi-Fi and 802.11 technologies, and by using such peer-to-peer routing techniques incorporating broadband communications to assemble ad hoc and scalable networks, as illustrated by Mesh Networks. It will be readily appreciated that the present invention contemplates having the capability to expeditiously avail itself of networks of varying reach and of varying bandwidth in order to adapt to a plethora of available communications environments and to accommodate communications environments of varying bandwidth and reliability.

Since the present invention is designed to provide an early warning vehicle for preventing suspicious or troublesome situations from developing into imminent danger or life-threatening situations, the preferred embodiment includes built-in communications redundancy. Accordingly, backup links are preferably provided to assure uninterrupted connectivity so that real-time conditions or near-real-time conditions may be recorded without any gaps that may correspond to valuable data critical to proper and thorough analysis and comprehension of a particular circumstance. Thus, uninterrupted connectivity to the plurality of data centers is accomplished through backup, fault-tolerant means including a satellite backup link. Data transfer rates on the order of standard 9600 Baud provide acceptable coverage and upload performance under circumstances in which cellular coverage is not available.

The preferred embodiment of the present invention normally operates under one of three modes: snooze, active, and alarm. Snooze operating mode corresponds to power-save mode that consumes minimal battery-power. It will be appreciated that, while operating in snooze or standby mode, the remote unit taught by the present invention may nonetheless be activated by input signals from an integrated sub-system such as the serial interface, or by periodic wake-up timers incorporated onto the circuit board.

Active mode corresponds to the default operating state when the remote mobile unit is powered on. While operating in active state, the mobile unit is responsive to commands received from a remote data center.

Alarm mode corresponds to high-caution, high-alert operation, wherein the plurality of cameras are functional and live streaming and messaging are triggered as herein described. It should be evident that a mobile unit will also be responsive to commands from the data center.

It is a feature and advantage of the present invention that a continuous live video and/or audio stream is recorded and analyzed in real-time or near-real-time so that a prescribed person, entity, or physical premise may be thoroughly monitored and secured. For streaming recorded data via cellular means, the preferred embodiment uses four miniature video cameras and two microphones. The live video/audio stream along with received or generated control signals are uplinked to a plurality of data collection centers via the cellular channel. To enable instantaneous responsiveness and remedial action to be effectuated, control codes including an alarm code should preferably be transmitted at regular intervals. For instance, transmitting a suitable alarm code sequence every 25 seconds provides sufficient feedback in many circumstances. It will be appreciated that another feature and advantage of the present invention is that subscribers may access the video streaming information and the like via mobile devices such as a wireless Palm or Blackberry, a modem-equipped microcomputer in the form of a desktop or notebook, from the office, from the home, or from anywhere in between. That is, embodiments of the present invention enable an early-warning communications security navigation system to be effectuated in real-time or at least near-real-time for a plethora of applications and to be accessed virtually anywhere that an adequate mobile communications link may be invoked and exploited.

It will be understood that from the streaming data from the remote mobile unit to the data center that portrays a person, entity, place, or event—preferably in video and perhaps augmented with sound—the status and condition is analyzed and then a responsive plurality of control codes is transmitted back to the remote unit for corrective action, if necessary and possible. According to the preferred embodiment, the alarm code may signify one of the following: a life-threatening situation with code "LIFETHREAT"; a roadside assistance situation with code "ROADSIDEASSIST"; a general abnormal, albeit not life-threatening, situation with code "GENERAL." It will be appreciated that a generic code is particularly useful if the installed hardware does not allow the user to distinguish between alarm types. For example, this limitation attaches if there are no separate alarm-specific buttons for a user to press or if insufficient buttons are available.

The preferred embodiment contemplates a plurality of remote mobile units that may be configured to transmit video information and the like along with received or generated control signals via cellular and/or satellite communications. For alert information transmitted from the remote unit via satellite uplink to a control center, the received data preferably comprises GPS position, alarm code, vehicle speed, video stream from a plurality of in situ digital cameras. In its simplest form, streaming video information is a series of snapshots that capture the relationship of the driver to the vehicle and to the passengers, if any. It should be apparent that, depending upon the extent of visual reporting intended, a corresponding plurality of cameras should be emplaced at suitable locations both inside and outside the vehicle. Similarly, for alert information transmitted from the remote unit via cellular communications uplink to a control center, video streaming or a series of snapshots may be operational based upon the particular requirements and supporting infrastructure.

It is a feature and advantage of the present invention that the plurality of mobile units are designed for the nature and extent of video streaming to be controlled from a plurality of data/control centers. It will be appreciated that the nature and extent of the video stream is defined by a plurality of parameters including: streaming rate (frames/second), frame size dimensions, streaming cameras (of the plurality of locally available cameras), start/suspend/stop streaming per camera, selective activation of audio streaming, and shut-off alarm/streaming.

Another feature of the preferred embodiment is that alert streams, generated in alarm mode, can be triggered alternatively locally by a user from within the vehicle, remotely from a data/control center by an authorized operator, or remotely by a user/subscriber through a Web page. It should be clear that alert streams generated and transmitted according to the teachings of the present invention are immediately visible to a plurality of remotely disposed operators.

Video and audio information recorded in situ and then uplinked to a plurality of control centers as herein described may be encoded and streamed using available technologies including low bit-rate ASV, Real Media or QuickTime. It should be apparent to those skilled in the art that the encoded frame sets must be streamed out to the data centers while simultaneously adjusting streaming rate to be commensurate with available bandwidth. Otherwise, as is the situation when uploaded data exceeds the capacity of available transmission facilities, video information will be "pulsed" rather than streamed as contemplated hereunder.

To track a vehicle in real-time or near-real-time, GPS positioning information should preferably be recorded and uplinked over cellular channels or the like in a suitable transmission mode: alarm mode, periodic mode, or poll mode. It will be understood that under alarm mode a remote mobile unit transmits GPS information while in an alarm condition that is triggered either locally in (or at) the vehicle or remotely from a data center or the like. As herein described, the GPS information is refreshed or transmitted on a recurring basis—according to a prescribed time interval preferably measured in seconds. On the other hand, under periodic transmission mode, GPS information is uplinked according to a predetermined time interval preferably measured in minutes. In poll mode, GPS information is uplinked only when affirmatively requested by a control center or the like.

It will be understood that, in order to provide flexible operations and to accommodate a plethora of circumstances that may arise, the plurality of remote mobile units of the present invention are designed to be configured locally via an electrically-attached or wireless console, or remotely from the data center via a panoply of downlinked control parameters. It will be appreciated that these control parameters may downloaded by streaming or by periodic transmission according to a predetermined schedule.

According to the preferred embodiment, a plurality of users interact with the plurality of locally situated mobile units. Likewise, a plurality of operators and subscribers interact with the plurality of data/control centers. At a control center, an operator is preferably sufficiently skilled to evaluate and analyze the incoming real-time or near-real-time video and preferably audio information, and, if necessary, promptly initiate appropriate remedial action. Of course, integral to such remedial action is having the infrastructure in place to contact geographically-placed law enforcement personnel or the like. It will be appreciated that inherent in such operator's effective interaction with the system of the present invention, is access to a plethora of authorized and predefined activities. Of course, the operator's first activity is to gain legitimate access to the system via a conventional login/logout process that includes a password and may also include a plurality of personal characteristics or the like that are reconciled with a biometrics database. Such biometric database stores such data as facial characteristics, finger prints, voice prints, retina scan, etc. Once granted access to the system, the operator will view incoming information from a plurality of mobile units and associated alert parameters. Contemplated operator activities comprise exercising streaming control; viewing geographical location (on a suitable United States map) associated with an alert; searching for previously stored alert video information or other relevant video information useful for interpreting incoming video streams for a particular subscriber; replaying alert videos if needed for proper early-warning analysis or the like; viewing user activity history; viewing subscriber account history.

It should be clearly understood that operational attributes and responsiveness depend from a subscriber's designated level of service. For example, a subscriber may be satisfied, presumably based upon cost considerations, to communicate near-real-time information via dial-up telecommunications rather than to communicate real-time information via a high-speed broadband network or the like. Obviously, an embodiment of the present invention having dial-up telecommunications as a primary conduit for communicating with remote data centers can generally support only limited uplinking of video streams and the like. On the hand, an embodiment having the benefit of broadband with pre-assigned frequencies and always-on telecommunications or the like supports essentially unlimited continuous streaming of video and audio streaming.

Several subscriber functions are provided preferably accessed through a Web interface enabled by conventional browser software or the like. First, a subscriber must gain legitimate access to the system via a conventional login/logout process that includes a password and may also include a plurality of personal characteristics or the like that are reconciled with a biometrics database. Such biometric database stores such data as facial characteristics, finger prints, voice prints, retina scan, etc. Once granted access to the system, the subscriber will view the plurality of vehicles being monitored and secured. Contemplated subscriber activities comprise polling remote mobile units for GPS information; viewing live video streams; viewing geographical location (on a suitable United States map) associated with an alert; searching for previously stored alert video information or other relevant video information useful for interpreting incoming video streams for particular users; replaying alert videos if needed for proper early-warning analysis or the like; viewing user activity history; activating and deactivating alarms on a plurality of remote mobile units.

It will also be understood that embodiments of the present invention should preferably be implemented with certain functions that are performed automatically to sustain the plurality of databases and associated functionality as described herein. Of course, many of the data-related functions are integral to the operational requirements of the plurality of data and control centers taught by the present invention. For example, it should be evident that the system of the present invention is constantly performing a data collection function. As herein described, data collection and concomitant database activities are performed by data/control center personnel. Such personnel actively monitor incoming channels for video streams and audio streams for alert-triggering information, and also monitor incoming information for explicit alerts. It should be clear that data/control center personnel envisioned hereunder include subscribers who may typically be operating microprocessors in the form of a handheld computer/PDA, a desktop computer, a notebook or sub-notebook computer, or the like, that has communications capability either built-in or available by interconnecting with suitable peripheral devices such as modems. These subscribers may be parents, friends, teachers, or other concerned individuals who seek to secure individuals while present in mobile vehicles such as automobiles, trucks, buses, water craft, and airplanes, or while present at particular places or premises.

To effectively conduct the collection of real-time or near-real-time data and to contemporaneously evaluate and analyze this data, it has been found to be imperative to avoid or to at least minimize bottlenecks and delays. Accordingly, it has been found to be advantageous to inherently provide adequate database redundancy to assure the integrity of continuous system operation. As hereinbefore described, hardware configurations of embodiments of the present invention should be selected to afford contemplated performance and response times to properly monitor in real-time or at least in near-real-time designated persons, entities, property, and the like. Preferably, all incoming data streams should be migrated to redundant files so that relationship database behavior may be exploited with efficiencies well known in the art. Such techniques as the application of persistent storage have been found to promote sustaining the integrity of collected video streams and the like. This practice helps assure that collected data is safely migrated to a plurality of knowledge-bases that may be used to monitor and reconcile real-time information with historical comparable information. As depicted in FIG. 7, video streaming server 270 enables video information that has been stored in a plurality of video databases to be expeditiously retrieved and exploited. As will be appreciated by those skilled in the art, such devices as Windows Media Services and Real Media Server may conveniently be used to orchestrate these functions.

It should be clear to those skilled in the art that the present invention allows an early warning security system to be effectuated not only for an individual automobile, but also for a plurality of automobiles comprising a fleet of vehicles. Such a fleet can be traced with real-time or at least near-real-time data regarding the operational aspects and location of the plurality of vehicles being recorded and uplinked in real-time or near-real-time to a fleet control and data center. Any deviation from an expected pattern of behavior, based upon real-time or at least near-real-time information perhaps in view of related accumulated, historical information would trigger action by dispatched authorities and law enforcement personnel or the like, and possibly the user too. GPS tracking can help secure valuable goods and hazardous goods in transit, wherein a deviation from a preplanned route may be immediately investigated and theft be avoided.

The present invention may also be adapted to secure a residence or the like. It will be understood that a plurality of digital video cameras and other recording and monitoring devices should be located throughout the premises at strategic points of entry and, generally, at suitable monitoring locations. As will be evident, such peripheral devices should be emplaced externally and internally, preferably in inconspicuous locations to avoid detection. Once these recording devices are emplaced, then the early-warning real-time or near-real-time streaming information contemplated by the present invention may be recorded, evaluated, and acted upon. For instance, a home owner may easily check the status and integrity of the home premises from a car during the drive home. This checking aspect will, of course, be achieved via remote access using cellular communications, a PDA, notebook or sub-notebook computer, or the like, wherein a link is established with a regional or central control center, and appropriate video and audio information is downloaded to the inquiring home owner. Suitable contemporaneous and/or real-time or near-real-time video feeds and the like would be downloaded to the home owner relative to prescribed locations, e.g., street in front of house, front yard, back yard, driveway, garage, roof, kitchen, etc. Thus, any anomalies perceived by the home owner user driving home can be ascertained prior to arriving at home; any remedial action necessitated by the presence of an intruder or a suspicious character or vehicle hovering in the vicinity of the residence can be safely instigated early-on to prevent any threat to life or limb. As will be readily understood by those skilled in the art, the systems taught by the present invention also enable remote discovery of an anomaly or the like by a home owner at work or by a subscriber accessing the system via cellular communications, on-line communications, or the like access, or by an operator located at a central or local control center. It will be understood that such video and/or audio security will be established using such peripheral devices as wireless video cameras and the like that are configured with an interface for both in situ control by an authorized, authenticated user and remotely by an authorized, authenticated subscriber and/or operator. A by-product of the functionality of the present invention is that a user may even control the operation of lights and appliances throughout the home and implicated premises.

Thus, it should be evident to those skilled in the art that embodiments of the present invention accommodate a wide variety of applications including, by way of illustration but not limitation, automotive security, emergency response, roadside service, GPS mapping, personal data assistance, fleet vehicle monitoring—DHL, UPS, FEDEX, USPS, Brinks armored carriers and the like, monitoring usage of car rentals, flight/hotel reservation itineraries downloaded to a particular vehicle or personal computer, sending vital information regarding vehicle diagnostics directly to automotive dealers—pertaining to personal, fleet, medical, commercial carrier, and law enforcement vehicles. In view of the breadth of applicability of the present invention, it is contemplated that embodiments will typically provide user or customer profiles for customization to specific needs. As an example, users have the ability to monitor their home or vehicle remotely via a personal computer, notebook computer or the like, or via a wireless handheld device with telecommunications capabilities such as the Palm VIIx. Personal calendars can be updated on the fly by a user logging onto designated Web sites or limited access intranets or extranet or the like. The availability of TFT touch screens or the like, there is easy access to user-specific profiles.

As another example of an important application of the present invention, consider security logistics associated with airport safety and airline travel. From the vantage point of airport security, embodiments of the present invention provide means for early-warning of any deviation from the normal protocol and behavior that occur thereat. For instance, means are provided for securing an airport's premises relative to incoming and outgoing cars and other ground transportation vehicles. As will be understood by those skilled in the art, these means include a plurality of strategically placed digital cameras and sound-gathering devices for recording and uploading a stream of video and audio information to an on-site data/control center. Such data collection devices should be situated at appropriate intervals on each entry to the airport's roads, and at appropriate intervals as the airport is approached. Additional data collection devices should be situated at appropriate locations in parking lots and parking garages. Still additional video and audio data collection devices should be situated at appropriate locations frequented by pedestrian traffic, including ticket purchasing, baggage checking, and ticketed-passenger entry points. Similarly, additional video and audio data collection devices should be situated at appropriate locations that implicate ticketed passengers, e.g., shops, restaurants, and gate areas.

It will be appreciated that data collected, besides being transmitted to a plurality of local data/control centers or the like, may be simultaneously or contemporaneously uploaded to a plurality of regional data/control centers and/or to a central data/control center. The present invention contemplates a configuration of data/control centers commensurate the intended level of service to achieve the hereinbefore described early-warning objectives. Ergo, for securing airport premises and the like, a high level of security service is obviously imperative. Accordingly, real-time or near-real-time recording of vehicular and pedestrian traffic, and immediate monitoring and analysis thereof should be the order of the day. Any suspicious behavior or any deviation from anticipated actions and activities should received immediate attention from trained personnel.

Those skilled in the art will appreciate that careful analysis of incoming video and audio streams can lead to early-warning of incipient troublesome or dangerous situations. For example, the rapidly developing biometrics art enables facial expressions and concomitant gesticulations and movements to be evaluated either alone or in conjunction with a comparative analysis vis a vis behavioral and image databases. These patterns may be reviewed by trained personnel either manually or by preprogrammed computer, or both—in real-time or near-real-time or the like. Under the preferred embodiment, this biometrics-based reconciliation and recognition step would be effectuated via computer so that matches or "hits" could be established in real-time or near-real-time wherein a pop-up window or the like would appear on the computer display with an identification of the individual and any available comments or warnings pertaining to the individual's status.

According to the present invention, these reconciliation and recognition functions should preferably achieved by use of a reference database that stores a plethora of data pertaining to the characteristics and biometrics and the like that help identify individuals and understand individuals' behavior. For example, the reference database should preferably include a behavior pattern database that shows facial patterns and concomitant hand-and-arm gesticulations that enable insight into an individual's mental state and motivations for manifest conduct. Of course, any number of relevant databases may be interrelated to achieve the early-warning identification and remedial-triggering purposes of the present invention.

To effectively secure an airplane, monitoring and the like should preferably commence at the airline ticket counter and baggage check-in, and proceed to passenger and carry-on baggage check-in via X-ray machine, hand-operated wand, or the like. Simultaneously with this conventional X-ray activity the present invention would be engaged in generating a constant video stream and the like so that any and all behavior patterns by not only passengers, but also airport personnel could be observed and evaluated in real-time or at least in near-real-time. This streaming monitoring and analysis would persist in the gate area and carry forward into the jet-way leading to the airplane, per se. As herein described, a plurality of cameras and the like would be strategically placed—some conspicuously and some clandestinely—to generate the constant real-time video and audio stream contemplated hereunder.

It will be understood that during this entire security process envisioned and enabled by the present invention, airline personnel may reconcile each ticketed passenger, each boarding passenger, each boarded passenger with the official manifest list, with the checked-baggage list, with checked baggage identification, with identification on carry-on baggage to ascertain whether any anomalies exist. Thus, it should be apparent that the present invention contemplates an early-warning, zero-tolerance security system hereinbefore unknown in the art.

Once passengers are granted entry to the airplane and are seated, the present invention still monitors all activity on the airplane, again, via a plurality of strategically placed digital cameras and the like, in order to provide a stream of video and audio information to be transmitted in real-time or at least in near-real-time to a suitable plurality of data/control facilities. Indeed, it will be appreciated that one of the pluralities of such data/control facilities should preferably be situated in the cockpit so that pilot and staff may observe all activity and passenger behavior occurring throughout the airplane—before takeoff and during the flight. Airline security personnel should preferably be in constant contact with the pilot/co-pilot and air traffic control personnel to assure that a fail-safe threshold is reached before authorizing airplane's doors to be latched and clearing the airplane for taxiing on the runway for takeoff. It is contemplated that by enabling every passenger to be closely monitored, including matching a passenger to an assigned seat and to checked baggage, an early-warning security system is in-place allowing airline security personnel, among other things, to place a face with a seat number and name. All visual and audio-visual information obtained is stored in a plurality of databases that may be reconciled with domestic enforcement databases and may be further reconciled with international databases for tracking and identifying known terrorists and violent felons and the like, as early as possible (ideally, prior to the flight taking off).

Yet another feature and advantage of the present invention is the ability to routinely sustain airplane security while the airplane is on the ground being maintained and serviced. That is, embodiments of the present invention may be used to secure an airplane while under the influence of non-flight crews, e.g., personnel performing cleaning, food catering services, lavatory services, seat repair, and scheduled and ad hoc maintenance. Personnel identification may be achieved visually via reconciling video streaming results with facial characteristics and badge identification, and any other biometrics and behavioral information available. Obviously, by invoking a diversity of Internet and intranet-enabled knowledge bases, the integrity and background may be verified for each individual who comes into contact with the airplane. Any suspicious or otherwise unacceptable result will be flagged to trigger immediate notification of airport and/or airline personnel and available law enforcement personnel. It will also be understood that air traffic control should preferably be in constant audiovisual communication with an aircraft so that a geofenced flight path may be readily created and monitored in real-time or at least in near-real-time. Then, if an airplane deviates from its designated flight path, immediate remedial action will be instigated. For instance, military aircraft may be alerted immediately to provide as escort or to identify any threats to major metropolitan areas or the like. To mitigate imminent danger to life and property, military action may even be ordered if a sufficiently dangerous threat has been confirmed.

Figure 8:
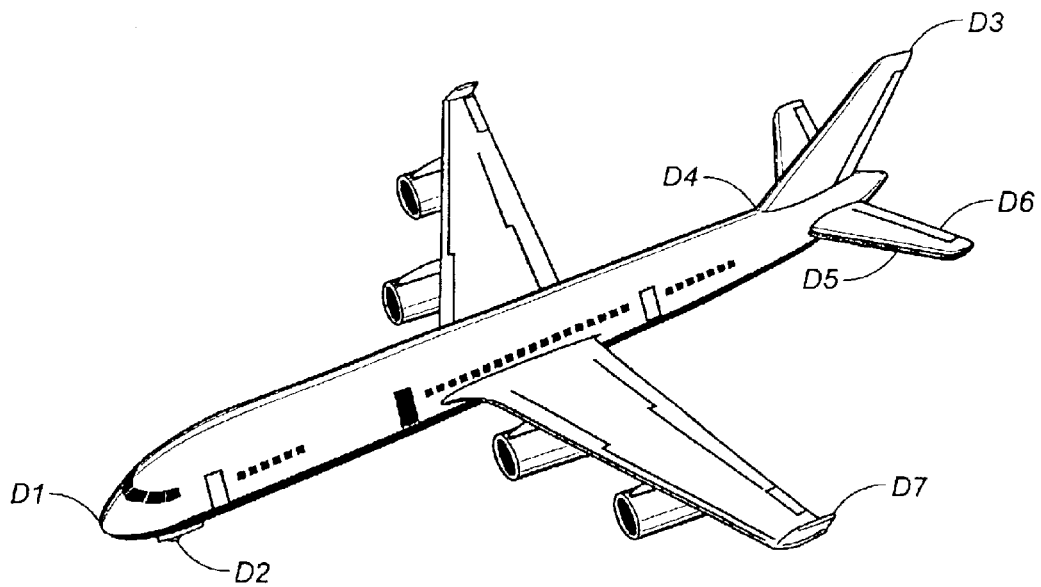
FIG. 8 is a simplified picture of an embodiment of the present invention applied to the exterior of an airplane, showing the placement of a plurality of real-time data recording devices that are disposed at certain airplane parts and joinders thereof.

As yet another dimension of the teachings of the present invention, a plurality of digital cameras and other suitable real-time recording devices may be strategically disposed on the exterior of an airplane. For example, FIG. 8 shows a plurality of such devices Di that are disposed at certain airplane parts and joinders thereof. Thus, data collection device D1 is disposed at the radome; data collection device D2 is disposed at the landing gear doors; data collection device D3 is disposed at the rudder; data collection device D4 is disposed at the vertical stabilizer; data collection device D5 is disposed at the horizontal stabilizer; data collection device D6 is disposed at each of the elevators; and data collection device D7 is disposed at each of the winglets. Similarly, digital camera and other suitable data collection devices should preferably be situated conspicuously or clandestinely, as deemed appropriate, at such external locations as the tail cone, the flap-track fairings, the wing assembly, the wing-to-body fairing, the engine nacelles and thrust reversers, the pylon fairings and the flaps and ailerons. It should be clear that the stream of audio and video information flowing from this plurality of devices allow the integrity of an airplane's exterior to be secured in real-time or at least near-real-time. It will also be understood that the plurality of data collection devices contemplated by the present invention include appropriate airport locations that are proximal to an airplane while awaiting service and boarding in a gate or while being maintained and serviced in a hangar or the like.

It has been found that adequate performance is obtained via a configuration with single input Multicam/DMRS, laptop with Windows 95, 98 or ME (for ease of inputting predetermined parameters or the like in the field), 200 MHz microprocessor, 32 MB RAM preferably with 2 MB of RAM on the VAG board. For remote access capabilities, it has been found that a modem should at least have 33.6 bps. Voice features have been provided via a full-duplex sound card, e.g., Sound Blaster cards. Redundancy, of course, is advantageous and, indeed, may often be critical, in certain embodiments of the present invention. This may be provided via the Quad, Six-Pack & Dual Multicam PC or laptop. To assure proper acquisition of the video signal contemplated by the present invention it has been found that a CPU such as the 350 MHz Pentium II, with 64 MB RAM and 4 MB on the system board is satisfactory. It will be appreciated by those skilled in the art that this is not just a redundancy consideration, but also provides sufficient power and functionality for the concomitant VGA card to expeditiously process the prerequisite video signals.

An embodiment of the present invention configured for use in an automobile has been implemented using a notebook computer configured as herein described. Recording a black-and-white (B/W) image at 5 frames per second is practicable with 10 Gigabytes' hard disk space available. It will be understood that such images could be recorded for about 2500 hours, corresponding to more than 3 months' activities or the like. It will be appreciated that a camera located in an automobile dome fixture may be augmented with a motion detector. To promote real-time transmission of such digitally recorded pictures data compression has been found to be advantageous for continuous recording and achieving sufficient pixel sensitivity. It has been found that a camera disposed on an automobile's outside mirror should preferably have 12× zoom capabilities to provide sufficient monitoring of the periphery of the automobile.

To provide a convenient user interface to embodiments of the present invention, a TFT or touch screen display has been found to be effective. This affords easy access for defining on-site parameters to assure that security objectives are apt to be met. Touch screen options may be used to monitor other sites with cameras that are peripheral to a particular automobile. For example, a parking lot or parking garage may be monitored simultaneously with the monitoring of a particular automobile.

The embodiment of the present invention depicted in FIGS. 1–5 show the variations for integrating and porting necessary hardware components, including TFT, CRT, and the USB port for the Mux. The user may define camera zoom functions or camera triggers or the like. Passwords and lock-out protections preferably provide the ability to customize the plurality of features without jeopardizing system integrity and reliability. Hardware components that have been found effective in embodiments of the present invention include the CAM 1-BW2000 miniature camera. It has been found that such on-site characteristics as the human hand are shown with adequate perspective and definition via the Intel D810E2CA3 Cayman 3 Motherboard; other satisfactory CPU chips include the Intel 9868 or 6898 or the 4898. It will be understood that any other comparable chip manufactured by AMD or other manufacturer may be used in embodiments of the present invention. It will also be understood that selection of suitable cameras depend from a consideration of size, available light, exposure to weather, likelihood of tampering and other risk factors.

It will, of course, be evident to those skilled in the art that the examples herein mentioned are for illustrative purposes only and are not intended to limit the scope of the present invention. In some embodiments of the present invention, a camera which measures 25 mm by 25 mm and 15 mm thick has been useful. Under certain circumstances an infrared camera is essential for generating suitable visual images taken in the dark. Where color is deemed to be advantageous, a somewhat larger camera such as the CAM4-IRB and the CAM5-CC2000 (36 mm×36 mm×15 mm) have been effective. It should be clear to those skilled in the art that proper implementation of on-site hardware will assure that the security system of the present invention delivers an accurate real-time or near-real-time audio visual rendition of the people and things being monitored.

Figure 6:
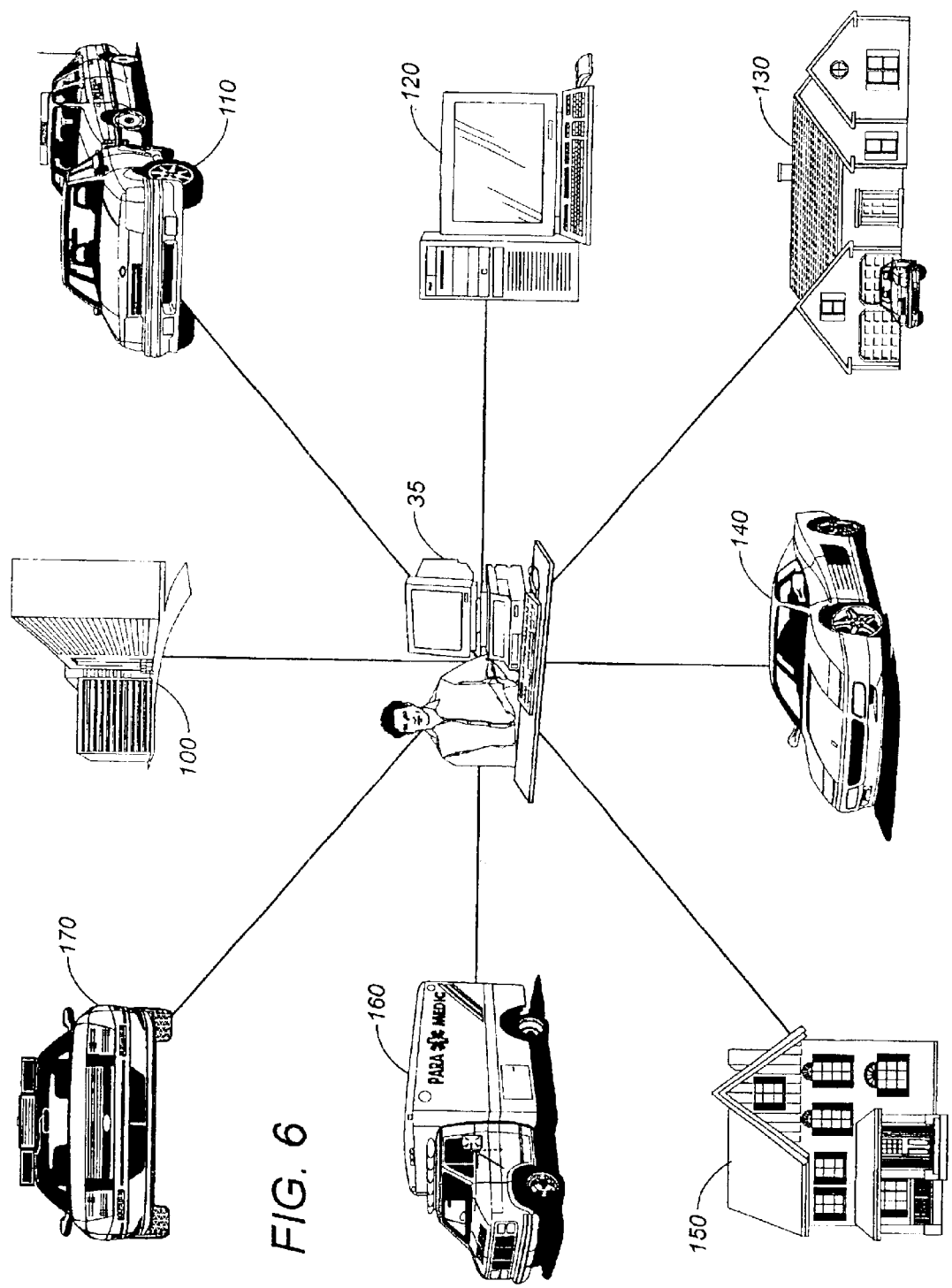
FIG. 6 is a pictorial block diagram of representative applications of embodiments of the present invention.

Referring now to FIG. 6, there is depicted a pictorial block diagram of representative applications of embodiments of the present invention. Downlinking control facility 35 is depicted as the center of preventive and remedial action to be taken as a function of analysis of the incoming real-time or near-real-time stream of audio visual signals. That is, referring to FIGS. 1 and 6, it is clear that the signals being uplinked in real-time or near-real-time from a physical situs are, in turn, down linked to control facility 35. Block 100 represents the application of the present invention to a hotel reservation scenario. Using the infrastructure taught by embodiments of the present invention, hotel reservations and concomitant information about the hotel and its surroundings may be downlinked from central control 35 directly to a user's local controller 5. Of course, this local controller may be implemented in a conventional notebook computer, in a hand-held computer such as a Palm VIIx, or even to a Blackberry device or the like. Block 170 represents the application of the present invention to a road assistance scenario. It will be readily appreciated that audio visual signals may be manually uplinked by a stranded user to a satellite or GPRS or the like, thereby availing itself of GPS technology, wherein these signals are promptly downlinked to control station 35; emergency relief would then be immediately dispatched to rescue the stranded driver.

Similarly, block 160 represents the application of the present invention to an emergency response scenario. Embodiments of the present invention could be used to monitor the movements and progress of Brinks armored carriers and the like, law enforcement vehicles transporting convicted criminals from jail to prison, ambulances transporting seriously-injured personnel, etc. Obviously, by sustaining a continuous stream of real-time or near-real-time communications between these vehicles in the field, the control center of the present invention may assure that all necessary law enforcement or medical preparations are being made by forwarding all such communications thereto in real-time or at least in near-real-time. Having the benefit of such an early warning system will promote the public safety and prevent or mitigate the onset of dangerous and hazardous circumstances that have become all too common.

As will be appreciated by those skilled in the art, blocks 110, 120, 130, and 150 pertain to applications that seek to defend citizens and property against the criminal element and the like. In particular, block 110 represents the ability of the present invention to identify criminals and property that has been stolen by such criminals. The real-time or near-real-time stream of audio visual and control signals generated from a stolen car protected by an embodiment of the present invention will be hotlinked to the central command center, which will immediately notify law enforcement personnel. Depending upon the circumstances, law enforcement personnel may already be in pursuit of the stolen vehicle and need to be pin-pointed to a particular location. In conjunction with GPS facilities, such pin-pointing is clearly within the scope of the present invention. It will further be understood that embodiments of the present invention may exploit databases storing facial characteristics and the like of known criminals or terrorists at large, and conduct continuous identification attempts at significant or heavily-frequented public or government places or the like.

Blocks 120 and 130 represent different variations of the present invention that may be applied to monitoring an automobile and/or a home. More particularly, the embodiment pictured in block 120 contemplates monitoring an automobile either locally at home or at work. On the other hand, the embodiment pictured in block 130 contemplates monitoring an automobile and home from a remote location. In either situation, the present invention provides the real-time or near-real-time audio visual information prerequisite for tracking the integrity of automobile and home. Similarly, the embodiment pictured in block 150 contemplates the thorough monitoring of a home wherein a plurality of cameras are strategically and surreptitiously located there through in order to monitor all relevant activities and events. A predetermined set of trigger events should preferably be established so that real-time or at least near-real-time recording may be activated when needed. Once triggered, preferably patrolling law enforcement personnel may be dispatched forthwith. The embodiment pictured in block 140 represents a novel application of the present invention to engine systems. While, of course, applicable to all automobiles and the like, this embodiment is especially suited to high-performance and racing cars that depend upon high efficiency during exigent operating conditions. It will be appreciated that the present invention can accommodate this scenario by real-time or near-real-time audio visual monitoring to provide an early warning of any adverse conditions that are apt to be detrimental to anticipated racing performance or the like. As will be appreciated by those skilled in the art, this embodiment may also be used to cause engine operation to cease. That is, under circumstances in which a vehicle is confirmed to be operated by an unauthorized driver, pilot, or the like, then it is within the teachings of the present invention to trigger engine shut-down from one of the plurality of control centers described herein. It will be appreciated, however, that such a remotely-controlled drastic procedure should preferably only be activated under clearly exigent and profoundly dangerous circumstances. Such a circumstance would occur when a mass media vehicle such as a bus, train, or airplane is taken over by terrorists or the like.

It is also within the teachings of the present invention that, if an interruption to the uplinking aspect has occurred, the security system may locally store the continuously generated audio video digital signals until the uplink is restored. Notwithstanding that it is an advantage and feature of the system taught by the present invention that the integrity and reliability of the uplinking and downlinking is maximized to assure that the real-time and near-real-time objectives are routinely accomplished, serious assaults may be made by the force of nature or by terrorists or the like. Depending upon the seasonal attributes and concomitant weather expectations of specific geographic regions, and, of course, depending upon susceptibility to assaults by terrorists or the like, hardware should preferably be judiciously selected to afford sufficient operational and storage capability. If, for instance, there is a likelihood of power breakdowns, then battery backups or replacement batteries should be locally available. All other appropriate steps should be taken to assure that the early warning fail-safe objectives of the present invention are satisfied.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, and that the examples recited herein are intended to illustrate the underlying concepts and are not intended to constitute a limitation thereof. The present invention is to be measured by the scope of the appended claims.

What is claimed is:

1. In a mobile vehicle having a driver and a plurality of passengers, a near-real-time early-warning security system comprising:

a plurality of data collection devices disposed in and upon strategic locations of said vehicle, for recording a continuous stream of audio and visual information in at least near-real-time responsive to the relationship of said driver and said plurality of passengers to said mobile vehicle;

a plurality of control devices disposed in and proximal to said mobile vehicle, for generating and receiving control signals responsive to the relationship of said driver and said plurality of passengers to said mobile vehicle, for controlling local operation of said mobile vehicle and for establishing mode of operation of said plurality of data collection devices;

microprocessor means for controlling which data collection devices of said plurality of data collection devices are active and operational for recording said collected information in and upon strategic locations of said vehicle, and for coordinating said mode of operation of said plurality of data collection devices;

first communications means for transmitting and uploading a continuous stream of said collected information in at least near-real-time from said plurality of data collection devices to a second communications means disposed remotely of said first communications means;

said first communications means also transmitting and uploading said control signals in at least near-real-time from said plurality of data collection devices to said second communications means;

said second communications means transmitting and downloading said continuous stream of collected information and said control signals received from said first communications means to a plurality of data/control centers;

a streaming information collection database for storing said downloaded continuous stream of collected information for analysis and reconciliation with a reference database for identifying incipient or existing troublesome or dangerous situations involving said mobile vehicle and said driver and said plurality of passengers; and trigger means for alerting enforcement personnel to take immediate remedial action and for generating appropriate control signals responsive to said identification of incipient or existing troublesome or dangerous situations and for transmitting and downloading said appropriate control signals by third communications means from said plurality of data/control centers to said plurality of control devices to modify said operation of said mobile vehicle.

2. The early-warning security system recited in claim 1, wherein said plurality of data collection devices comprises a first plurality of data collection devices that are disposed conspicuously.

3. The early-warning security system recited in claim 1, wherein said plurality of data collection devices comprises a second plurality of data collection devices that are disposed clandestinely.

4. The early-warning security system recited in claim 1, wherein said plurality of data collection devices comprises a third plurality of digital video cameras.

5. The early-warning security system recited in claim 1, wherein said plurality of data collection devices comprises a fourth plurality of audio recording devices.

6. The early-warning security system recited in claim 1, wherein said reference database includes a behavioral pattern database.

7. The early-warning security system recited in claim 6, wherein said reference database includes a GPS database.

8. The early-warning security system recited in claim 6, wherein said reference database includes biometrics information about personnel authorized to function as said driver and said plurality of passengers.

9. The early-warning security system recited in claim 6, wherein said reference database includes biometrics information about suspicious or terrorist personnel who are being sought by law enforcement personnel.

10. The early-warning security system recited in claim 1, wherein said first communications means comprises cellular communications.

11. The early-warning security system recited in claim 10, wherein said first communications means also comprises satellite communications.

12. The early-warning security system recited in claim 1, wherein said second communications means comprises cellular communications.

13. The early-warning security system recited in claim 12, wherein said second communications means also comprises satellite communications.

14. The early-warning security system recited in claim 1, wherein said third communications means comprises broadband networked communications.

15. The early-warning security system recited in claim 14, wherein said third communications means also comprises satellite communications.

16. The early-warning security system recited in claim 1, wherein said downloaded collected information stored in said collection database is migrated to said reference database responsive to said analysis and reconciliation.

17. The early-warning security system recited in claim 1, wherein said mode of operation of said plurality of data collection devices comprises a first mode wherein power is conserved and said system is in a stand-by or snooze mode until an activation signal is received from said plurality of control/data centers.

18. The early-warning security system recited in claim 1, wherein said mode of operation of said plurality of data collection devices comprises a second mode wherein said system is in an active mode recording said information in at least near-real-time responsive to the relationship of said driver and said plurality of passengers to said mobile vehicle until an alarm signal or stand-by signal is received from said plurality of control/data centers.

19. The early-warning security system recited in claim 1, wherein said mode of operation of said plurality of data collection devices comprises a third mode wherein said system is in an alarm mode effecting immediate remedial action corresponding to said triggering means.

20. The early-warning security system recited in claim 1, wherein said plurality of data/control centers includes a plurality of authorized devices adapted for remotely accessing said streaming information collection database.

21. The early-warning security system recited in claim 20, wherein said plurality of remote authorized devices comprise a plurality of suitably configured microcomputers.

22. The early-warning security system recited in claim 20, wherein said plurality of remote authorized devices comprise a plurality of suitably configured hand-held devices.

23. The early-warning security system recited in claim 20, wherein said plurality of remote authorized devices comprise a plurality of suitably configured land-line telephones.

24. The early-warning security system recited in claim 20, wherein said plurality of remote authorized devices comprise a plurality of suitably configured wireless telephones.

25. In a premises having a plurality of occupants, a near-real-time early-warning security system comprising:
a plurality of data collection devices disposed in and upon strategic locations of said premises, for recording a continuous stream of audio and visual information in at least near-real-time responsive to the relationship of said plurality of occupants to said premises;
a plurality of control devices disposed in and proximal to said premises, for generating and receiving control signals responsive to the relationship of said plurality of occupants to said premises, for controlling local operation of said premises and for establishing mode of operation of said plurality of data collection devices;
microprocessor means for controlling which data collection devices of said plurality of data collection devices are active and operational for recording said collected information in and upon strategic locations of said premises, and for coordinating said mode of operation of said plurality of data collection devices;
first communications means for transmitting and uploading a continuous stream of said collected information in at least near-real-time from said plurality of data collection devices to a second communications means disposed remotely of said first communications means;
said first communications means also transmitting and uploading said control signals in at least near-real-time from said plurality of data collection devices to said second communications means;
said second communications means transmitting and downloading said continuous stream of collected information and said control signals received from said first communications means to a plurality of data/control centers;
a streaming information collection database for storing said downloaded continuous stream of collected information for analysis and reconciliation with a reference database for identifying incipient or existing troublesome or dangerous situations involving said premises and said plurality of occupants; and
trigger means for alerting enforcement personnel to take immediate remedial action and for generating appropriate control signals responsive to said identification of incipient or existing troublesome or dangerous situations and for transmitting and downloading said appropriate control signals by third communications means from said plurality of data/control centers to said plurality of control devices to modify said operation of said premises.

26. The early-warning security system recited in claim 25, wherein said plurality of data collection devices comprises a first plurality of data collection devices that are disposed conspicuously.

27. The early-warning security system recited in claim 25, wherein said plurality of data collection devices comprises a second plurality of data collection devices that are disposed clandestinely.

28. The early-warning security system recited in claim 25, wherein said plurality of data collection devices comprises a third plurality of digital video cameras.

29. The early-warning security system recited in claim 25, wherein said plurality of data collection devices comprises a fourth plurality of audio recording devices.

30. The early-warning security system recited in claim 25, wherein said reference database includes a behavioral pattern database.

31. The early-warning security system recited in claim 30, wherein said reference database includes a GPS database.

32. The early-warning security system recited in claim 30, wherein said reference database includes biometrics information about personnel authorized to function as said plurality of occupants.

33. The early-warning security system recited in claim 30, wherein said reference database includes biometrics information about suspicious or terrorist personnel who are being sought by law enforcement personnel.

34. The early-warning security system recited in claim 25, wherein said first communications means comprises cellular communications.

35. The early-warning security system recited in claim 34, wherein said first communications means also comprises satellite communications.

36. The early-warning security system recited in claim 25, wherein said second communications means comprises cellular communications.

37. The early-warning security system recited in claim 36, wherein said second communications means also comprises satellite communications.

38. The early-warning security system recited in claim 25, wherein said third communications means comprises broadband networked communications.

39. The early-warning security system recited in claim 38, wherein said third communications means also comprises satellite communications.

40. The early-warning security system recited in claim 25, wherein said downloaded collected information stored in said collection database is migrated to said reference database responsive to said analysis and reconciliation.

41. The early-warning security system recited in claim 25, wherein said mode of operation of said plurality of data collection devices comprises a first mode wherein power is conserved and said system is in a stand-by or snooze mode until an activation signal is received from said plurality of control/data centers.

42. The early-warning security system recited in claim 25, wherein said mode of operation of said plurality of data collection devices comprises a second mode wherein said system is in an active mode recording said information in at least near-real-time responsive to the relationship of said plurality of occupants to said premises until an alarm signal or stand-by signal is received from said plurality of control/data centers.

43. The early-warning security system recited in claim 25, wherein said mode of operation of said plurality of data collection devices comprises a third mode wherein said system is in an alarm mode effecting immediate remedial action corresponding to said triggering means.

44. The early-warning security system recited in claim 25, wherein said plurality of data/control centers includes a plurality of authorized devices adapted for remotely accessing said streaming information collection database.

45. The early-warning security system recited in claim 44, wherein said plurality of remote authorized devices comprise a plurality of suitably configured microcomputers.

46. The early-warning security system recited in claim 44, wherein said plurality of remote authorized devices comprise a plurality of suitably configured hand-held devices.

47. The early-warning security system recited in claim 44, wherein said plurality of remote authorized devices comprise a plurality of suitably configured land-line telephones.

48. The early-warning security system recited in claim 44, wherein said plurality of remote authorized devices comprise a plurality of suitably configured wireless telephones.

49. A near-real-time early-warning security system for monitoring in at least near-real-time with a plurality of remotely operated microcomputers the movement of a plurality of individuals relative to environing premises or to associated vehicular travel by accessing a security database containing audio and visual streaming information, said near-real-time early-warning security system comprising:

a plurality of data collection devices disposed in and upon strategic locations proximal to said plurality of individuals, for recording a continuous stream of audio and visual information in at least near-real-time responsive to the relationship of said plurality of individuals to said environing premises or to associated vehicular travel;

a plurality of control devices disposed in and proximal to said plurality of individuals and said environing premises or associated vehicular travel, for generating and receiving control signals responsive to the relationship of said plurality of individuals to said environing premises or associated vehicular travel, for controlling local interaction between said plurality of individuals and said environing premises or associated vehicular travel for establishing mode of operation of said plurality of data collection devices;

microprocessor means for controlling which data collection devices of said plurality of data collection devices are active and operational for recording said collected information, and for coordinating said mode of operation of said plurality of data collection devices;

first communications means for transmitting and uploading a continuous stream of said collected information in at least near-real-time from said plurality of data collection devices to a second communications means disposed remotely of said first communications means;

said first communications means also transmitting and uploading said control signals in at least near-real-time from said plurality of data collection devices to said second communications means;

said second communications means transmitting and downloading said continuous stream of collected information and said control signals received from said first communications means to a plurality of data/control centers;

a streaming information collection database for storing said downloaded continuous stream of collected information for analysis and reconciliation with a reference database for identifying incipient or existing troublesome or dangerous situations involving said plurality of individuals and said environing premises or associated vehicular travel; and trigger means for alerting enforcement personnel to take immediate remedial action and for generating appropriate control signals responsive to said identification of incipient or existing troublesome or dangerous situations and for transmitting and downloading said appropriate control signals by third communications means from said plurality of data/control centers to said plurality of control devices to modify said interaction of said plurality of individuals with said environing premises or associated vehicular travel.

50. The early-warning security system recited in claim 49, wherein said plurality of data collection devices comprises a first plurality of data collection devices that are disposed conspicuously.

51. The early-warning security system recited in claim 49, wherein said plurality of data collection devices comprises a second plurality of data collection devices that are disposed clandestinely.

52. The early-warning security system recited in claim 49, wherein said plurality of data collection devices comprises a third plurality of digital video cameras.

53. The early-warning security system recited in claim 49, wherein said plurality of data collection devices comprises a fourth plurality of audio recording devices.

54. The early-warning security system recited in claim 49, wherein said reference database includes a behavioral pattern database.

55. The early-warning security system recited in claim 54, wherein said reference database includes a GPS database.

56. The early-warning security system recited in claim 54, wherein said reference database includes biometrics information about personnel authorized to function as said plurality of individuals.

57. The early-warning security system recited in claim 54, wherein said reference database includes biometrics information about suspicious or terrorist personnel who are being sought by law enforcement personnel.

58. The early-warning security system recited in claim 49, wherein said first communications means comprises cellular communications.

59. The early-warning security system recited in claim 49, wherein said first communications means also comprises satellite communications.

60. The early-warning security system recited in claim 49, wherein said second communications means comprises cellular communications.

61. The early-warning security system recited in claim 60, wherein said second communications means also comprises satellite communications.

62. The early-warning security system recited in claim 49, wherein said third communications means comprises broadband networked communications.

63. The early-warning security system recited in claim 62, wherein said third communications means also comprises satellite communications.

64. The early-warning security system recited in claim 49, wherein said downloaded collected information stored in said collection database is migrated to said reference database responsive to said analysis and reconciliation.

65. The early-warning security system recited in claim 49, wherein said mode of operation of said plurality of data collection devices comprises a first mode wherein power is conserved and said system is in a stand-by or snooze mode until an activation signal is received from said plurality of control/data centers.

66. The early-warning security system recited in claim 49, wherein said mode of operation of said plurality of data collection devices comprises a second mode wherein said system is in an active mode recording said information in at least near-real-time responsive to the relationship of said plurality of individuals to said environing premises or associated vehicular travel until an alarm signal or stand-by signal is received from said plurality of control/data centers.

67. The early-warning security system recited in claim 49, wherein said mode of operation of said plurality of data collection devices comprises a third mode wherein said system is in an alarm mode effecting immediate remedial action corresponding to said triggering means.

68. The early-warning security system recited in claim 49, wherein said plurality of remotely operated microcomputers comprise a plurality of suitably configured desktop devices.

69. The early-warning security system recited in claim 49, wherein said plurality of remotely operated microcomputers comprise a plurality of suitably configured notebook devices.

70. The early-warning security system recited in claim 49, wherein said plurality of remotely operated microcomputers comprise a plurality of suitably configured hand-held devices.

71. The early-warning security system recited in claim 49, wherein said plurality of remotely operated microcomputers comprise a plurality of suitably configured land-line telephones.

72. The early-warning security system recited in claim 49, wherein said plurality of remotely operated microcomputers comprise a plurality of suitably configured wireless telephones.

* * * * *